United States Patent
Sequeiros Murciano et al.

(10) Patent No.: US 7,612,979 B2
(45) Date of Patent: Nov. 3, 2009

(54) LIGHTNING PROTECTED AIRCRAFT TELESCOPIC REFUELING MAST

(75) Inventors: Felipe Sequeiros Murciano, Madrid (ES); Fernando Cano Perez, Madrid (ES)

(73) Assignee: EADS Construcciones Aeronauticas, S.A., Madrid (ES)

( * ) Notice: Subject to any disclaimer, the term of this patent is extended or adjusted under 35 U.S.C. 154(b) by 316 days.

(21) Appl. No.: 11/411,984

(22) Filed: Apr. 26, 2006

(65) Prior Publication Data

US 2007/0217116 A1    Sep. 20, 2007

(30) Foreign Application Priority Data

Mar. 6, 2006  (EP) .................................. 06381009

(51) Int. Cl.
*H05F 3/00* (2006.01)
*H01H 47/00* (2006.01)
*H01H 3/00* (2006.01)
*H01H 3/02* (2006.01)

(52) U.S. Cl. ....................... 361/218; 361/212; 361/220

(58) Field of Classification Search .................. None
See application file for complete search history.

(56) References Cited

U.S. PATENT DOCUMENTS

| 5,973,903 A * | 10/1999 | Tomerlin ..................... 361/215 |
| 2003/0205643 A1* | 11/2003 | von Thal et al. ......... 244/135 A |

* cited by examiner

*Primary Examiner*—Albert W Paladini
*Assistant Examiner*—Dharti Patel
(74) *Attorney, Agent, or Firm*—Ladas and Parry LLP

(57) ABSTRACT

An aircraft telescopic in-flight refueling mast comprising a metallic structural beam (31), electrically connected to the aircraft by flexible conductive means (33), having inside a fixed metallic tube (11) and a metallic telescopic tube (11) providing the fuel conduit, and, attached to said beam (31), flight control surfaces (41) and protection means against electric discharges, specially lightning strikes and electro-static discharges, including insulated means (39, 51) and low conductive means (15, 17) for reducing the lightning currents at a safe level and for draining the static charge created during the refueling, and conductive means (19, 21, 23, 33, 43) providing a safe lightning current path and good electrical bonding for electro-static discharge.

5 Claims, 4 Drawing Sheets

LIGHTNING PROTECTED AIRCRAFT TELESCOPIC REFUELING MAST

FIELD OF THE INVENTION

The invention relates to an aircraft telescopic in-flight refueling mast protected against the effect of electric discharges, specially lightning strikes and static discharge.

BACKGROUND

An in-flight aircraft may be subject to a direct strike of lightning, which injects high current pulses into the airframe. This event encompass both following categories of effects:
  Direct attachment to the structure (local damage).
  Transfer lightning current through the structure.

These effects shall not lead to a hazardous situation compromising the continued safe flight and landing of the aircraft.

It is known that the aircraft protruding parts, areas called zone 1, are the most frequently struck by lightning. Rear locations of those aircraft parts, areas called zone 1B, experience the most severe ambient ($2 \times 10^5$ Amp, energy of $2 \times 10^6$ Amp$^2$ sec and charge transfer of 200 coulombs).

An Air-Air refueling operations consist in transferring fuel from a tanker aircraft to a receptor one. The function is performed by a conduit, which joins both aircrafts. Among others a telescopic refueling mast may be used.

Aircraft refueling masts are usually located at the rear part of the aircraft, therefore in the said lightning zone 1B.

Although refueling operation in stormy weather is not allowed, the tanker aircraft may be struck in its way to the operational area. For this purpose, at least, the telescopic refueling mast shall be protected against lightning in its retracted position.

Due to the nature of the telescopic mast (capable to be extended and retracted) the fuel conduct has sealing joints that will be stressed by lightning currents, causing arcing and sparking with energy (>200 uJ) enough to ignite fuel vapors.

One method of protection may be to electrically isolate the fuel conduit, so no arcing is expected since no lightning currents area allowed to flow inside. This means of lightning protection conflicts with the requirement to drain the static charge build-up caused by high-pressure fuel passage during refueling operation.

Accumulation of static charges may cause a danger of ignition of flammable vapors when uncontrolled discharges occur.

The present invention is intended to solve these drawbacks.

SUMMARY OF THE INVENTION

To accomplish this objective the present invention provides an aircraft telescopic in-flight refueling mast comprising a metallic structural beam, electrically connected to the aircraft by flexible conductive means, having inside a fixed metallic tube and a metallic telescopic tube providing the fuel conduit, and, attached to said beam, flight control surfaces, also comprising protection means against electric discharges, specially lightning strikes and electro-static discharges, including insulated means and low conductive means for reducing the lightning currents at a safe level and for draining the static charge created during the refueling, and conductive means providing a safe lightning current path and good electrical bonding for electrostatic discharge.

With said protection means, the aircraft telescopic in-flight refueling mast is adequately electrically bonded to the main aircraft structure and can dissipate any charge accumulated in a controlled manner to the atmosphere or ground.

The features, objects and advantages of the invention will become apparent by reading this description in conjunction with the accompanying drawings, in which:

DETAILED DESCRIPTION OF PREFERRED EMBODIMENTS

Figure 1:
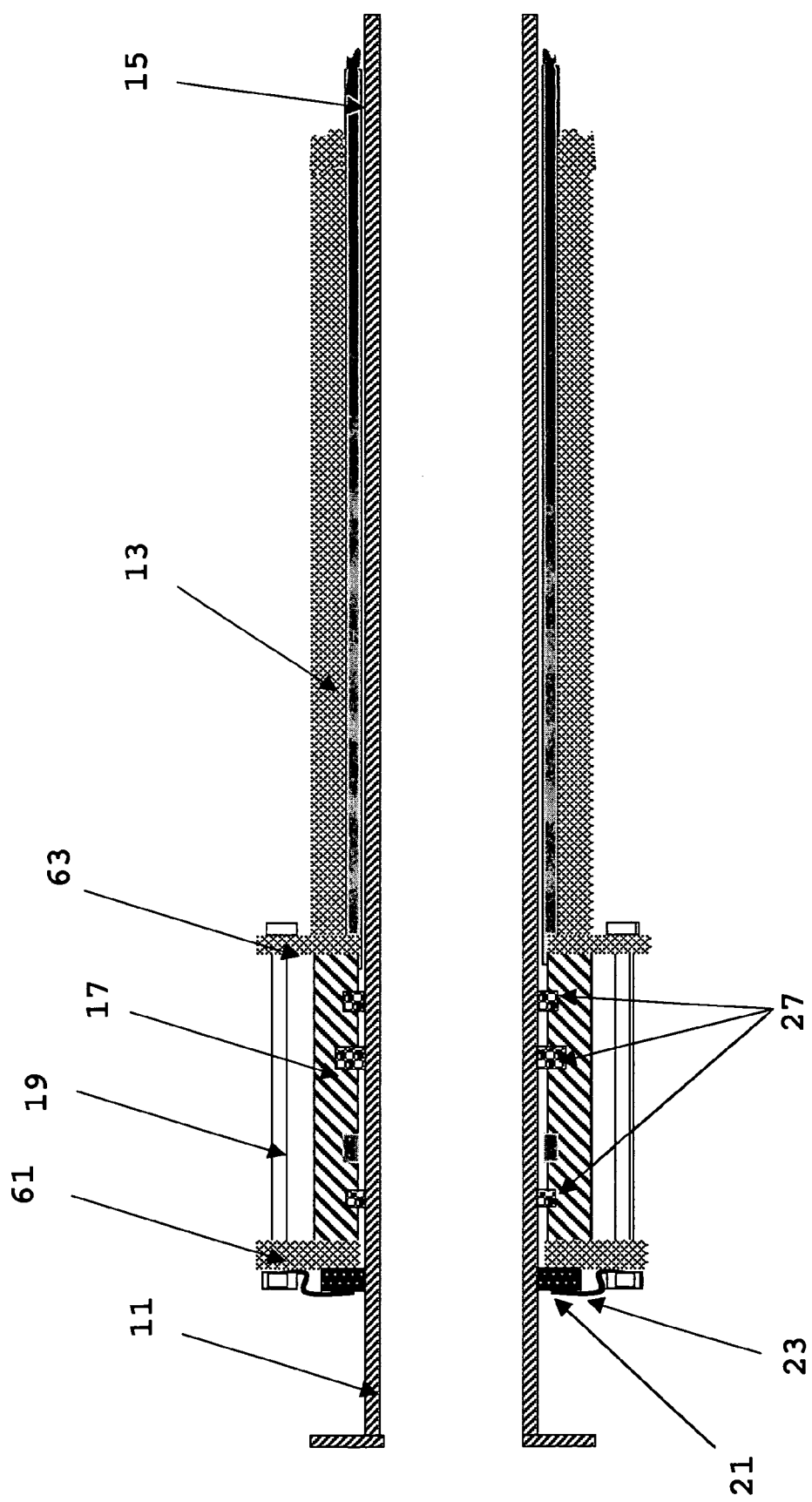
FIG. 1 is a partial sectional view of an aircraft telescopic refueling mast according to this invention showing schematically the assembly of the fixed and the telescopic tube.
Figure 2:
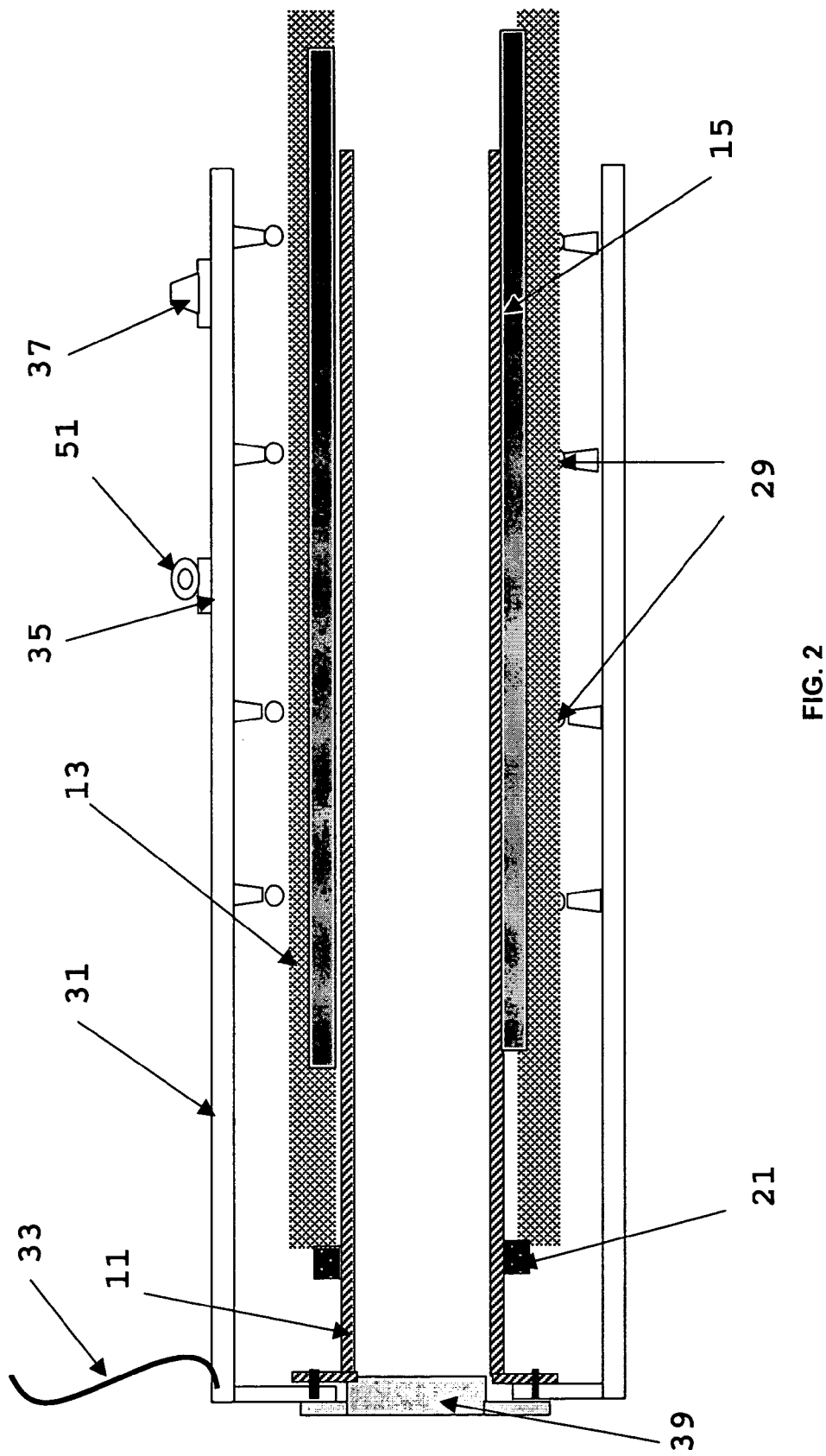
FIG. 2 is a sectional view of an aircraft telescopic refueling mast according to this invention showing schematically its electrical connections to the aircraft.

In order to explain the invention an example of the different embodiments is described below showing the different features for lightning protection and static charge conduction.

The design philosophy applied in this invention consists in diverting, as much as possible, lightning currents away from sealing joints or any part susceptible of producing sparking/arcing, while keeping certain electrical conductivity along the fuel-wet areas with two purposes:
  To equal electrical potential of both tanker and refueled aircrafts, when they approach one to the other.
  To drain the static charge created during the refueling.

To accomplish these objectives, the present invention provides a fix tube 11 and a telescopic tube 13 installed inside the metallic structural beam 31 in such a way the only element susceptible to receive a direct lightning strike, when the system is retracted, is the external structural beam 31.

An electrical path to the aircraft fuselage is provided from the worst-case lightning attachment to the mast flight control surfaces (ailerons) 41 though the metallic structural beam 31, which is connected back to the aircraft airframe by means of two flexible electrical connections 33. A retainer device 37 (for example arrestor hook) provides an additional electrical path between the structural beam 31 and the aircraft when the mast is in the stowage position.

The metallic fuel fix tube 11 is almost isolated from the metallic telescopic tube 13 by a concentric liner 15 made of slightly electrical conductive material, together with a segment 17 of the telescopic tube 13 made of slightly conductive material as well (for example carbon loaded plastic) assembled between flanges 61 and 63 connected by bolts 19, constituting a dynamic seal assembly. Said concentric liner 15 prevents fretting between telescopic 13 and fix 11 tubes and is able to drain the static charge.

The electrical contact between the metallic fix tube 11 and the metallic telescopic tube 13 is made through the metallic retainer bolts 19 and a conductive ring 21 (for example graphite) outside the fuel zone. The conductive ring 21 is connected to the telescopic tube 13 by means of flexible conductors 23 and in contact with the fix tube (face to face). Said retainer bolts 19 and conductive ring 21 allow therefore electrically jump said seal assembly 17 as a safe current path (out of fuel area) from the telescopic tube 13 to the fixed tube 11. This latest is electrically bonded to the structural beam 31.

An insulated fuel feeding pipe section 39 before the connection to the aircraft fuel system is provided to stop current to flow into it. Likewise, an insulated covering 51 is provided at mast hoisting point 35 to prevent current to flow trough the hoisting cable when entering the aircraft fuselage, avoiding electromagnetic coupling to system harnesses.

Figure 3:
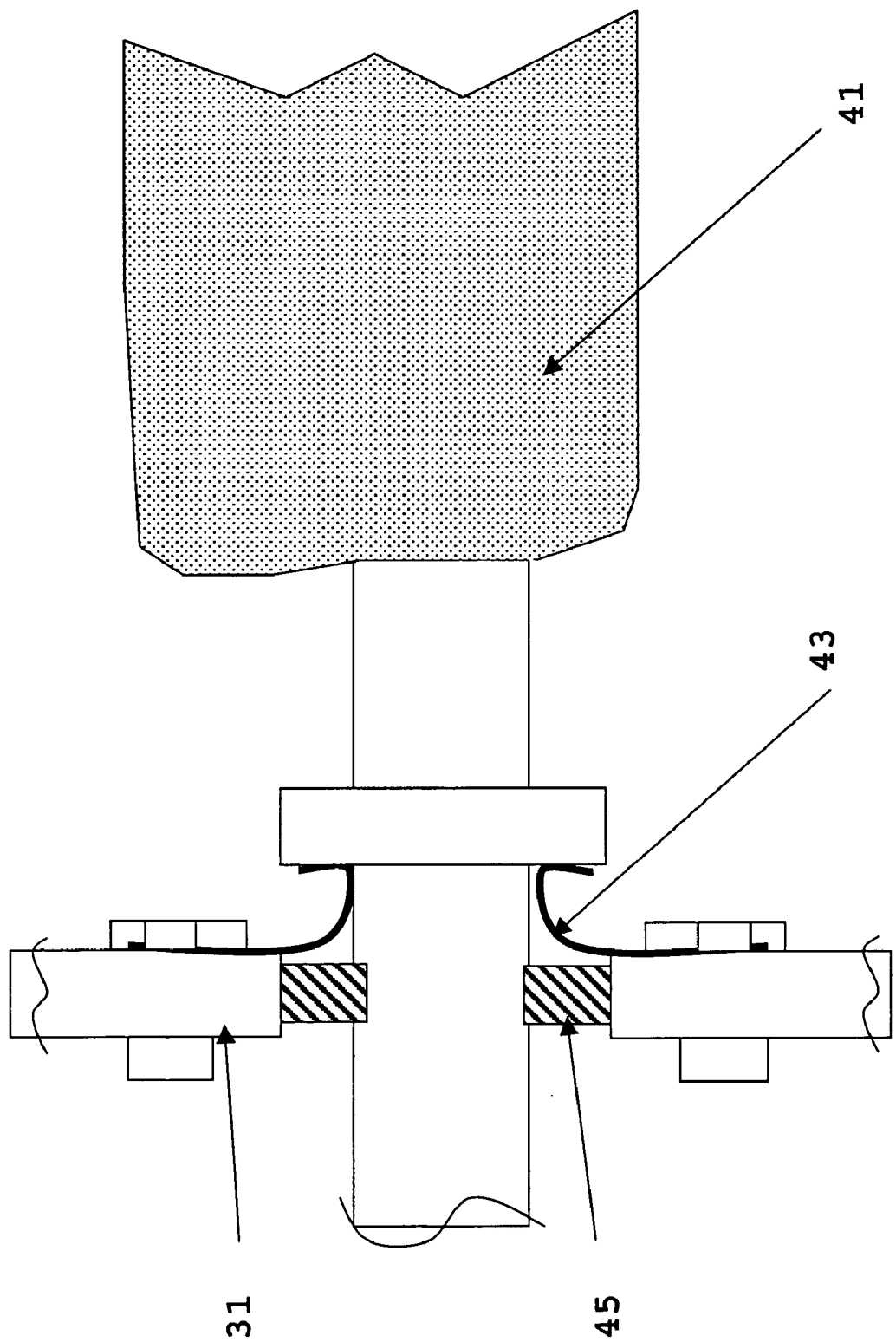
FIG. 3 is a sectional detailed view showing schematically one flight control surface attached to the structural beam of an aircraft telescopic refueling mast according to this invention.
Figure 4:
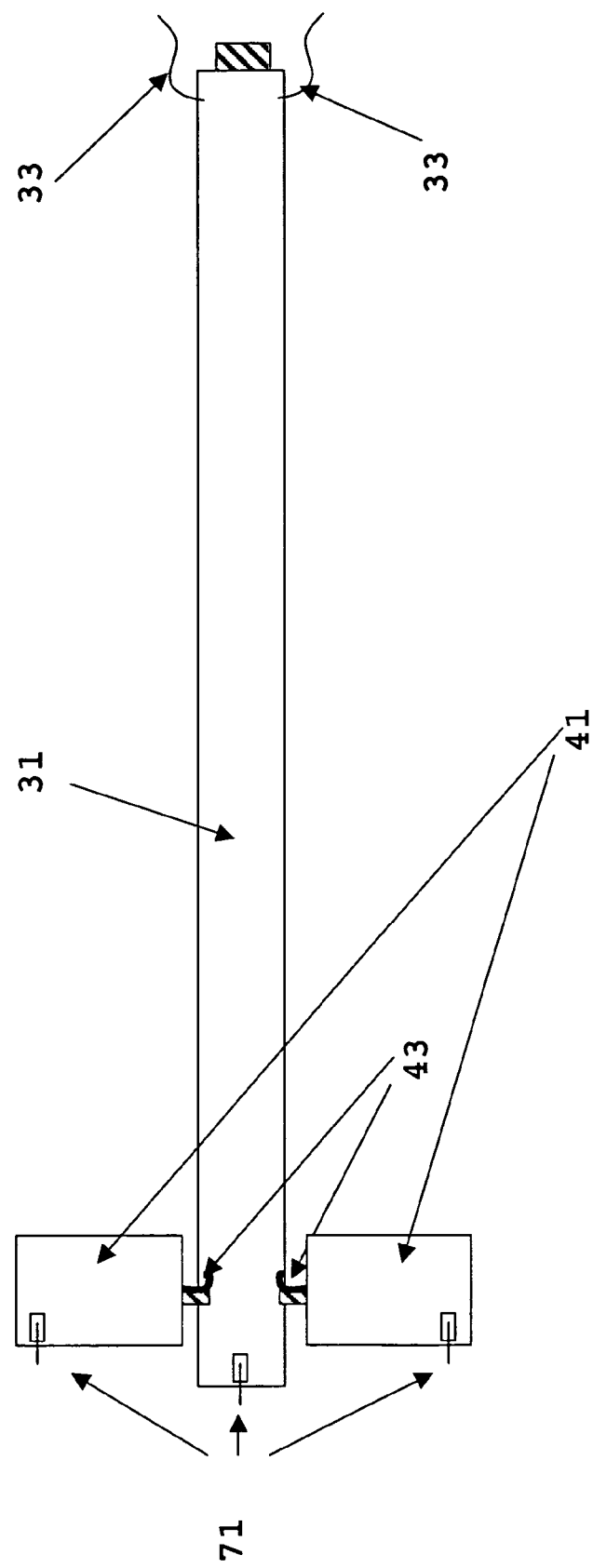
FIG. 4 is a top view of an aircraft telescopic refueling mast according to this invention showing schematically its electrical connections to the aircraft, flight control surface and electro-static discharges location.

As it can be seen in FIG. 3, the way to electrically discharge the mast aerodynamic control surface 41 to the metallic structural beam 31 is done by means of metallic sliding contacts 43, protecting the mast control surfaces and avoiding damages to the bushing 45.

Electro-static dischargers 71 are installed on the outer extremities of metallic structural beam 31 on the aerodynamic control surfaces 41 to drain static charges to the atmosphere in a safe way.

Although the present invention has been fully described in connection with preferred embodiments, it is evident that modifications may be introduced within the scope thereof, not considering this as limited by these embodiments, but by the contents of the following claims.

The invention claimed is:

1. An aircraft telescopic in-flight refueling mast, comprising:
   a metallic structural beam, electrically connected to the aircraft by flexible conductive means, having inside a fixed metallic tube and a metallic telescopic tube providing a fuel conduit, and, attached to said beam, flight control surfaces;
   protection means against electric discharges including lightning strikes and electro-static discharges, said protection means including insulated means and low conductive means for reducing the lightning currents to a safe level and for draining static charge created during refueling, said low conductive means including a concentric liner between the fixed tube and the telescopic tube and a low conductive segment assembled at the beginning of the telescopic tube constituting a dynamic seal between both tubes, and conductive means providing a safe lightning current path and good electrical bonding for electro-static discharge.

2. An aircraft telescopic in-flight refueling mast comprising:
   a metallic structural beam, electrically connected to the aircraft by flexible conductive means, having inside a fixed metallic tube and a metallic telescopic tube providing a fuel conduit, and, attached to said beam, flight control surfaces protection means against electric discharges including lightning strikes and electro-static discharges, said protection means including
   insulating means which include an insulated pipe section in the connection interface between the fixed tube and the aircraft fuel system and insulated fittings in those elements susceptible to inject current inside the aircraft fuselage,
   low conductive means which include a concentric liner between the fixed tube and the telescopic tube and a low conductive segment assembled at the beginning of the telescopic tube constituting a dynamic seal between both tubes, and
   conductive means which include means providing electrical contact between the fixed tube and the telescopic tube, sliding electrical contacts between the flight control surfaces and the beam, and flexible electrical connections between the structural beam and the aircraft.

3. An aircraft telescopic in-flight refueling mast according to claim 2, wherein said non conductive segment is assembled between a first flange and a second flange connected by bolts.

4. An aircraft telescopic in-flight refueling mast according to claim 2, wherein said means providing electrical contact between the fixed tube and the telescopic tube comprise a sliding ring connected to the telescopic tube through flexible conductors.

5. An aircraft telescopic in-flight refueling mast according to claim 1, further comprising electro-static dischargers installed on the outer extremities of metallic structural beam and aerodynamic control surfaces.

* * * * *